United States Patent [19]

Grantham et al.

[11] 4,379,718

[45] Apr. 12, 1983

[54] PROCESS FOR SEPARATING SOLID PARTICULATES FROM A MELT

[75] Inventors: LeRoy F. Grantham, Calabasas; James G. Johanson, Malibu Lake, both of Calif.

[73] Assignee: Rockwell International Corporation, El Segundo, Calif.

[21] Appl. No.: 264,496

[22] Filed: May 18, 1981

[51] Int. Cl.³ ............................................ C22B 21/00
[52] U.S. Cl. ........................................ 75/24; 75/63; 75/68 R; 75/93 R; 75/93 AC; 423/466; 423/491
[58] Field of Search ............... 75/24, 68 R, 63, 93 R, 75/93 AC; 423/466, 491

[56] References Cited

U.S. PATENT DOCUMENTS

| | | | |
|---|---|---|---|
| 811,522 | 1/1906 | Seaman | 75/24 |
| 2,987,391 | 6/1961 | Foster et al. | 75/68 |
| 3,694,190 | 9/1972 | Langston | 75/68 R |
| 3,798,024 | 3/1974 | Murphy et al. | 75/68 R |
| 3,801,003 | 4/1974 | Racunas et al. | 233/3 |
| 3,846,123 | 11/1974 | Racunas et al. | 75/68 R |
| 4,024,056 | 5/1977 | Yarwood et al. | 210/69 |
| 4,073,644 | 2/1978 | Papafingos et al. | 75/68 R |

FOREIGN PATENT DOCUMENTS 416401 6/1974 U.S.S.R. ........................ 266/235

Primary Examiner—M. J. Andrews
Attorney, Agent, or Firm—Clark E. DeLarvin; Henry Kolin; H. Fredrick Hamann

[57] ABSTRACT

A process for treating a metal recovery byproduct which contains solid ash constituents entrained in a melt comprising a major amount of a molten salt and a minor amount of molten metal in which the melt is filtered through a high-temperature filter apparatus containing a cylindrical rotating filter element to separately and continuously recover a filter cake containing the solid ash constituents and a molten filtrate containing the molten salt and molten metal. This molten filtrate may be directly recycled to the metal recovery process. The filter cake may be treated in an aqueous process to recover the salt therefrom for recycle to the metal recovery process. The invention is particularly applicable to the recovery of aluminum from its dross while removing ecologically damaging materials present in the ash.

9 Claims, 2 Drawing Figures

PROCESS FOR SEPARATING SOLID PARTICULATES FROM A MELT

FIELD OF THE INVENTION

The present invention relates generally to liquid-solids separation. It particularly relates to a process capable of continuously, rapidly, and economically separating particulate solids from a metal recovery byproduct containing a molten salt and usually containing minor amounts of a molten metal.

BACKGROUND ART

In many metal recovery processes, it has long been known that molten salt fluxes are effective in separating metals from their ashes. For example, in U.S. Pat. Nos. 2,987,391; 3,694,190; 3,798,024; and 3,846,123, aluminum is separated from its solid ash impurities such as its oxides, carbides, and nitrides. Metal-ash mixtures are obtained from metal recovery byproducts or waste forms such as skim, dross, metal turnings, and other forms of scrap. The utilization of molten salt fluxes, however, has been hampered by a lack of means for efficient and rapid removal of the solids which accumulate as a result of the separation process. Most of the molten metal will settle to the bottom of a container from which it is readily withdrawn. However, the accumulated ash solids and the molten salt will still contain significant amounts of the desired metal.

Various methods have been proposed for improving such metal recovery processes. For example, rotary salt furnaces have been used for separating oxides and other solids and impurities from the aluminum; but at the end of the separation process, a considerable amount of salt and metal remains with the accumulated solid impurities.

In the past, this mixture of fluxing salt, metal and solid particulate impurities, this mixture being usually referred to in the aluminum industry as "black dross," was allowed to cool in large rocks or chunks. These chunks or rocks of the black dross were usually treated with water and broken up to recover the larger pieces of aluminum metal entrained in the black dross. The metal would range in size from very fine particulates to pieces a few inches in thickness. Following removal of the mechanically recoverable aluminum metal, the remainder of the black dross was in the past discarded as having no value since it had been heretofore too expensive and difficult to recover the salt flux components or the remaining metal therefrom. In the past, the remainder of the black dross residue was disposed of by dumping it in quarries or other isolated locations. This type of disposal, however, is currently unacceptable from both a safety and ecological point of view since it presents a serious possibility that salts will be leached from this residue and could find their way into underground or surface water streams or reservoirs.

It has been proposed that the dross residue from metal recovery processes be further processed to recover substantially all of the salt flux and any remaining metal for recycle to the metal recovery process. Typically, complete recovery requires aqueous processing of the salt flux remaining in the dross residue. While such processing overcomes many of the disadvantages mentioned, the large volume of the dross residue which must be processed contributes significantly to the cost of operating a metal recovery process. Accordingly, it would be desirable to have some other method of further refining the dross residue to reduce the volume which must be subjected to aqueous processing. Further, it would be advantageous if such other process could be practiced at a temperature at which the fluxing salt was still in a molten state to reduce the thermal energy required to remelt the fluxing salt for recycle to the metal recovery process.

Another area of interest in which it is advantageous to effect such liquid-solid separation in a rapid and economical manner is in the production of magnesium from magnesium chloride. In such a process it is desirable to separate insoluble impurities from the magnesium chloride before it is used in an electrolytic production cell. The ability to effect rapid and economical separation of solids from molten salts also could be advantageously applied to metallurgical processes for the recovery of zinc, cadmium, thallium, tin, lead, antimony, and bismuth, among others.

SUMMARY OF THE INVENTION

The present invention provides an improvement for the further processing of a byproduct obtained in metal recovery processes wherein the byproduct has solid ash constituents entrained in a melt which comprises a major amount of a molten salt and generally a minor amount of a molten metal, which would be present in its elemental or uncombined form. The molten salt may comprise one or more halide salts of an alkali or alkaline earth metal; generally the eutectic mixture of the chlorides of sodium and potassium is utilized.

The present improvement comprises introducing such byproduct into a high-temperature filter apparatus containing a substantially cylindrical rotating filter element having inner and outer walls. The byproduct in the filter apparatus is maintained at a temperature such that the molten salt and molten metal, where present, are maintained at a temperature above their melting points. Advantageously, a pressure drop or differential is provided across a portion of the filter element walls to cause a more rapid separation of the solid ash constituents from the melt whereby the molten salt and molten metal, where present, pass through the filter element walls, forming a filter cake on one of the walls. The filter cake comprises substantially all of the solid ash constituents and only so much of the molten salt and molten metal as are entrained in the interstices of the solid ash constituents. The filter cake is continuously removed from the filter. The filtrate contains the molten salt, molten metal, where initially present in the melt, and may contain a small amount of very finely divided solid ash constituents which may pass through the pores of the filter element. The separately recovered molten filtrate is recycled in the molten state to the metal recovery process.

In accordance with a preferred embodiment, the melt containing the molten salt and molten metal, where present, is passed from an outer wall of the filter element and through the inner wall, a filter cake being formed on the outer wall. The filter cake is removed by providing a blade adjacent the surface of the outer wall of the filter element. The surface of the outer wall of the rotating filter element on which the filter cake has been formed approaches the blade, which is tangentially disposed in relation to the surface. The upper portion of the filter cake is cut from the rotating surface on contacting the blade and deposited in an adjacent lower trough. Advantageously, there also is provided a positive pressure on the inner wall of the filter element immediately adjacent the blade to provide a pressure differential across the filter element walls to facilitate removal of the filter cake by lifting the filter cake toward the blade.

In accordance with a particularly preferred embodiment, the filter cake, which is at a temperature essentially that of the molten filtrate, generally from about 660° to 750° C. for treatment of black dross, is cooled under an inert gas atmosphere to a temperature below about 300° C., and preferably below 100° C. for black dross processing. Thereafter, the cooled filter cake is digested with an aqueous solution to form a slurry comprising a concentrated salt solution in which the solid ash constituents are dispersed. This slurry is then filtered to separate the ash constituents from the concentrated salt solution filtrate. The filtered ash constituents are further treated with water to effect substantially complete separation of any salt remaining with the solid ash constituents, whereby the solid ash constituents can be safely disposed of, for example, in a land fill, without danger of any pollution to the environment, or utilized in metallurgical processes as a slag former.

The concentrated salt-containing filtrate, substantially free of ash constituents, is partially evaporated to provide a slurry of dispersed salts. The slurry is filtered to recover the dispersed salts, which are then dried, melted and recycled to the metal recovery process. The resultant filtrate, consisting of a saturated aqueous salt solution, is recycled to the prior digestion step.

These and other advantages and features of the invention will be more apparent from the following description and drawings.

DESCRIPTION OF A PREFERRED EMBODIMENT

Figure 1:
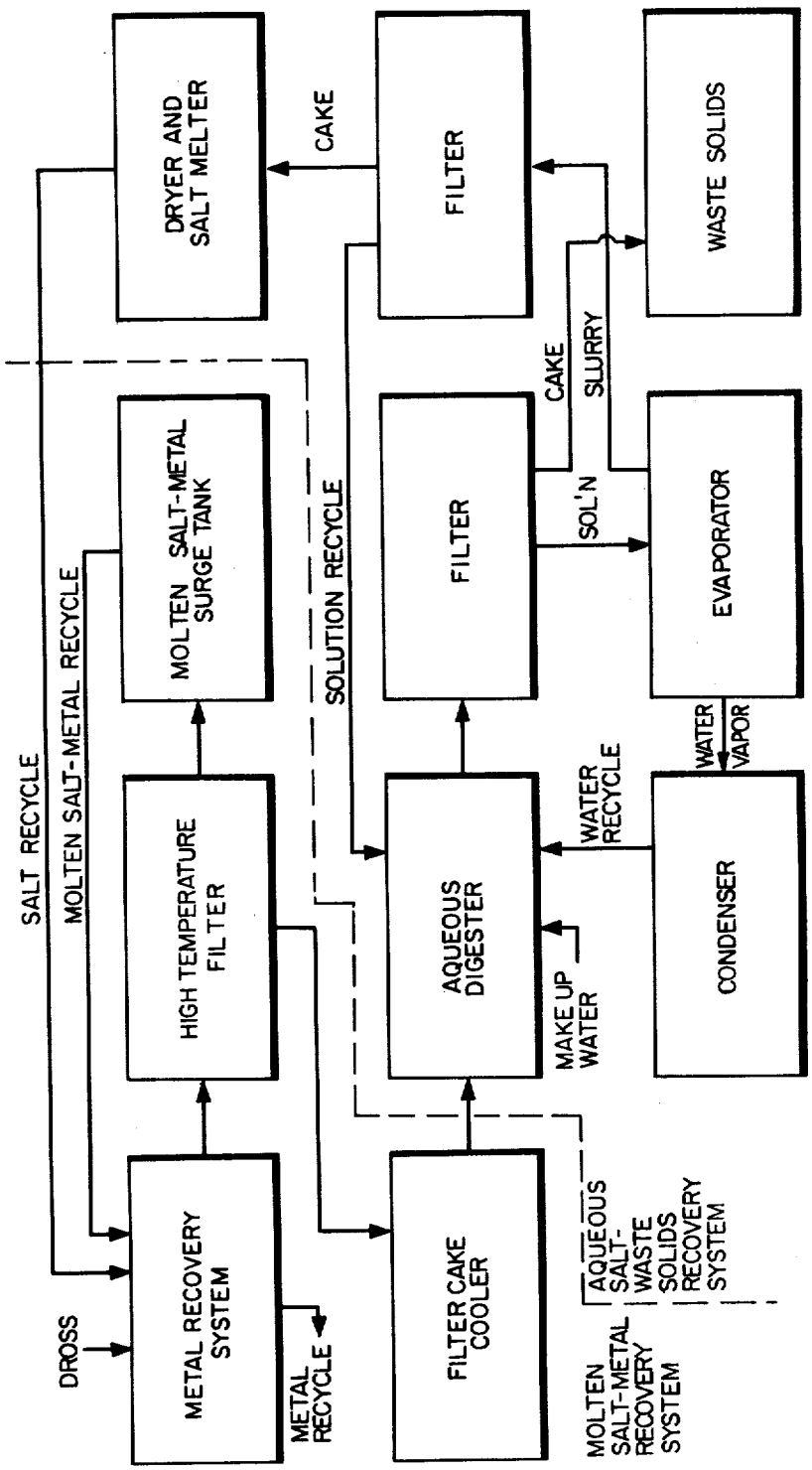
FIG. 1 is a flow diagram showing the process steps of the present invention.

Referring to FIG. 1, a flow diagram is shown for practicing the process steps involved in a particularly preferred embodiment of the present invention. The high-temperature (molten) portion of the process is shown separated from the low-temperature (aqueous) portion of the process by a broken line.

For convenience, the process will be described with reference to the treatment of the byproduct obtained from an aluminum recovery process, but it will be apparent that the process is equally applicable to a variety of other metal recovery processes. In the electrolytic recovery of aluminum from its ores, there is produced a skim or dross which is introduced into a metal recovery system, such as a rotary furnace. There, the dross comprising principally molten aluminum metal and solid ash constituents, i.e., aluminum-insoluble impurities such as metal oxides, nitrides and carbides, is mixed with a molten fluxing salt which generally comprises an equal weight mixture of sodium and potassium chloride and may optionally include up to about 20 wt %, based on the weight of the molten fluxing salt, of at least one additive selected from calcium chloride and a selected fluoride salt to further enhance the separation of the aluminum metal from the salt and solid ash impurities. The more commonly used fluoride salts are sodium fluoride, potassium fluoride, aluminum fluoride, and calcium fluoride.

The molten aluminum metal is periodically drawn off for use without further treatment or, optionally, it may be returned to the electrolytic furnace for further refining. The molten salt and solid ash impurities may also include a significant amount of aluminum metal entrained in the interstices of the solid ash particulates. This mixture of metal, ash and salt, which was heretofore generally treated as substantially a waste product, is further treated in accordance with the present invention to recover metal and salt, thus enhancing process economics and preventing ecological pollution. Advantageously, the ash impurities are separately recoverable as a saleable product.

Specifically, an aluminum metal recovery byproduct consisting of a melt comprising a major amount of molten salt and a minor amount of molten aluminum, and having entrained therein solid ash impurities, is introduced into a high temperature filter apparatus, which will be described later in more detail. Such a byproduct may contain approximately 40–80 wt % salt, 0–45 wt % aluminum, and 5–55 wt % ash. The molten salt may comprise a mixture of about 25–65 wt % sodium chloride and 35–75 wt % potassium chloride.

A filter cake of the solid ash impurities, which contain minor amounts of molten metal and molten salt entrained in their interstices, builds up on one surface of the filter. From an opposite surface of the filter there is withdrawn a molten filtrate comprising molten salt and molten metal, which is recycled to the metal recovery system.

The filter cake is removed from the high temperature filter apparatus and cooled in an inert atmosphere to prevent oxidation of any aluminum contained therein. Preferably, the cooled filter cake is then subjected to an aqueous processing for substantially complete separation of the solid ash impurities from the remaining salt. Alternatively, the filter cake could be disposed of as a waste since most of the metal and salt has already been recovered in the filtrate from the high temperature filter apparatus. This would eliminate the need for and cost of the low-temperature aqueous system depicted in FIG. 1.

The cooled filter cake is introduced into an aqueous digester to separate the soluble flux salts from the insoluble material, such as any remaining aluminum and ash. Preferably, the digestion is effected in a closed vessel where the filter cake is agitated with hot water to form a slurry in which the insoluble particles are suspended in a concentrated salt solution. The slurry is introduced into a first aqueous filter, which may be a centrifuge, rotary filter or other filtration device. There the slurry is separated into a filtrate and a filter cake. The filter cake contains the insoluble particles and entrained concentrated salt solution. If desired, this entrained salt-containing solution is readily removed by washing the filter cake to reduce the salt content to a desired level. The wash waters advantageously are then recovered and returned to the digester. The filter cake is now substantially free of any salt and can be safely disposed of as a waste since it now comprises only the solid ash impurities and any aluminum which may have been entrained with the salt in the solid impurities. Alternatively, the salt-free filter cake can also be used as a fluxing (slagging) agent in the steel industry.

The concentrated salt solution filtrate, substantially free of any solid impurities, is introduced into an evaporator to form a slurry of dispersed salt particles in a saturated salt solution, which is again filtered to form a filter cake and a filtrate. The filtrate advantageously is recycled to the aqueous digester to dissolve more salt. The filter cake, consisting of substantially pure fluxing salt, is dried, melted, and recycled to the metal recovery system. The moisture evaporated from the concentrated salt solution may be condensed and returned to the digester. Additional makeup water is introduced into the digester as required.

Figure 2:
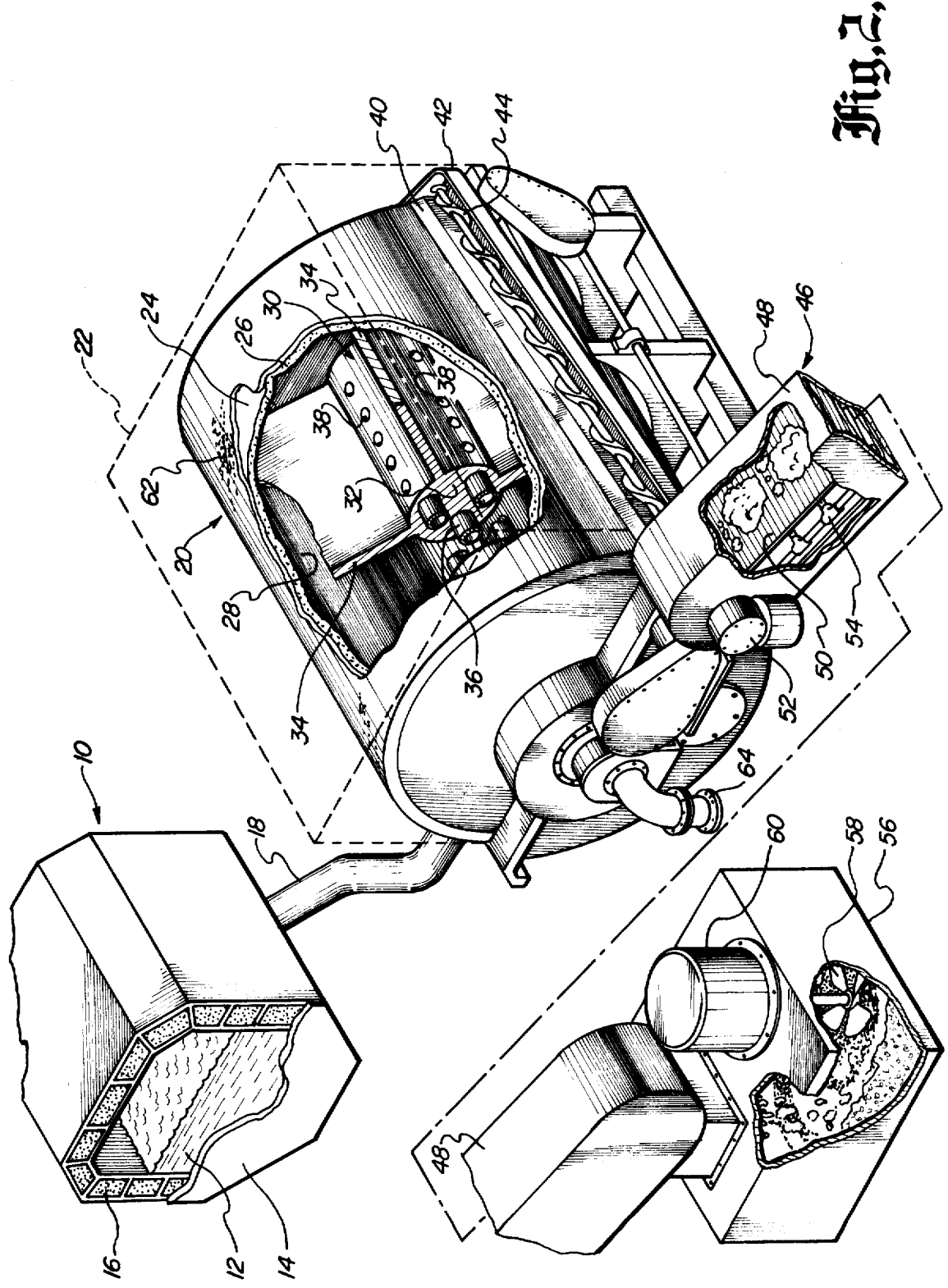
FIG. 2 is a perspective view partly in section of an apparatus preferred for practicing the process steps of the invention.

Referring now to FIG. 2, there is shown a perspective view, partly in section, of a high-temperature apparatus for use in the practice of the present invention. There is provided a vessel 10 which contains a body 12 of a melt for processing as described in FIG. 1. The body 12, as previously discussed, also contains solid ash impurities and generally a minor amount of molten metal.

Vessel 10 comprises a metal case 14, which is lined with a corrosion-resistant insulating material, such as a plurality of insulating bricks 16 to prevent heat loss from the melt. Vessel 10 further may include some auxiliary heating means (not shown) if required. The melt in vessel 10 flows through a conduit 18 to a high-temperature filter apparatus 20 provided wih one or more filter elements 26.

Filter apparatus 20 also is provided with an insulating cover 22 to minimize heat losses. Cover 22 also acts as a container for the melt introduced into filter apparatus 20. Within cover 22, the melt contacts an outer wall 24 of a porous, fluid-permeable, rotating filter element 26. Rotating filter element 26 is substantially cylindrical in shape and has an inner wall 28 which defines a cavity within filter element 26.

The process of the present invention may be used for treating byproducts from other than an aluminum metal recovery process, such as processes for the recovery of zinc, cadmium, tin, magnesium, and antimony. In such other processes, conventional high-temperature materials of construction, e.g., chromium-, nickel-, and cobalt-containing alloys, are utilized in vessel 10 and filter apparatus 20 for protecting those surfaces coming in contact with the metal recovery byproduct. These high-temperature materials are initially treated to form a protective oxide film, for example, chromium oxide, on such surfaces.

It will be appreciated, however, that molten aluminum is more difficult to contain in that it dissolves most conventional high-temperature materials of construction, even when coated wih a protective oxide film. Therefore, when the filter apparatus is used in accordance with the particularly preferred embodiment of this invention for the processing of black dross, the filter element and other surfaces in contact with the molten black dross must be made of material that is corrosion resistant to and substantially insoluble in molten aluminum. Exemplary materials suitable for such use include alumina-based ceramics, alumina, graphite, and alumina-based clays. Other materials which dissolve very slowly in molten aluminum and which could be used are aluminum-containing or aluminized metals which are protected by an alumina film. Another material which could be considered for such use is titania or high-titanium alloys protected by a titania coating. Zirconia can be similarly utilized.

Various methods of preparing filter element 26 from the above materials will be readily apparent to those versed in the art. For example, where the selected material is a graphite powder, this is mixed with an organic foam which is subsequently burned out to form a cohesive porous mass. Alternatively, finely divided selected metallic powders could be pressed and sintered, followed by oxidation, or selected ceramic materials could be pressed to a desired shape and then sintered to form a cohesive porous mass. The selected material also could be obtained in the form of fibers and woven into a filter mat or cloth. These mats or cloths would then be supported on a suitable reinforced structure such as a titania-coated titanium to provide the desired filter.

Located within the cavity in filter element 26 is a core assembly 30. Core assembly 30 comprises a rotatable shaft assembly 32, which is located coaxially within filter element 26. Rotatable shaft assembly 32 is provided with a plurality of radially extending fin members 34 which support filter element 26 and also divide the interior of filter element 26 into a plurality of compartments. As depicted there are three fin members dividing the filter element into three separate compartments; however, it will be readily apparent to those skilled in the art that a greater or lesser number of compartments could be utilized. Generally, it is preferred that about six compartments be provided for each filter element. Rotatable shaft assembly 32 further provides for fluid communication with each of the compartments. As shown in FIG. 2, such fluid communication is provided by a plurality of conduit members 36 which are in fluid communication with the compartments via a plurality of apertures 38.

A blade 40 is provided adjacent outer wall 24 of filter element 26 for removing any solid filter cake materials which collect on the surface of outer wall 24. Directly below and adjacent to blade 40 is a trough 42 which contains an auger 44 for transferring the collected solid filter cake to a conveyor system 46. Conveyor system 46 is provided with a cover 48 for containing an inert atmosphere within the system. The conveyor system further includes an endless belt 50, driven by a motor 52, for conveying the solid filter cake materials to a vessel 56. Advantageously, conveyer system 46 further includes means for quenching or cooling the solid filter cake materials conveyed on the belt, such as a plurality of sprays 54 for impinging a cooling fluid upon the belt and materials being conveyed thereon.

In accordance with a preferred embodiment of the invention, wherein the solid filter cake material is to be subjected to aqueous processing for further recovery of salt, vessel 56 serves as a digester which contains an unsaturated solution of the same salt being introduced therein. Vessel 56 also is provided with some agitation means, such as a blade 58 driven by a motor 60.

In operation, a byproduct from a metal recovery process comprising solid ash constituents or impurities entrained in a melt containing molten salt and molten metal is withdrawn from vessel 10 and passed to high-temperature filter apparatus 20 via conduit 18. The temperature of the byproduct is not particularly critical provided that it is sufficiently high to ensure that the salt and metal of interest are molten; generally a temperature range of from about 400° to 900° C. is suitable. Therein, a significant portion of the molten salt and molten metal flows through rotating filter element 26 leaving a filter cake 62 on outer wall 24. Filter cake 62 comprises the solid ash impurities and only so much of the molten salt and molten metal as are entrained in the interstices of the solid ash impurities.

The molten salt and the molten metal are withdrawn from filter apparatus 20 through apertures 38, conduits 36, and an outlet 64 for recycle to vessel 10. Advantageously, a pressure differential is applied across filter element 26 to enhance the separation between the molten mixture and the solids. The filter cake 62 on the surface of outer wall 24 is removed by blade 40 and falls into trough 42. From there, it is carried by auger 44 to conveyer system 46 for transfer to vessel 56, either for disposal or for further processing. Advantageously, as core assembly 30 rotates, a positive inert gas pressure (generally from about 15 to 45 psig) is applied to conduit 36 and apertures 38 in that compartment which is directly adjacent blade 40 to further facilitate the removal of filter cake from the filter element.

The particular inert gas used to prevent futher oxidation of the molten metal is not critical. Accordingly, any gas which will not react with the metal to form an oxide, carbide or nitride may be utilized. Examples of suitable inert gases include helium and argon, among others.

EXAMPLE

Several kilograms of a black dross discharged from the rotary kiln of a commercial aluminum metal recovery process were obtained. An 815-gram sample of the dross had a composition of approximately 48 wt % of a sodium chloride-potassium chloride eutectic, 3 wt % aluminum and 49 wt % aluminum-insoluble solid ash. This sample was melted and was quite fluid at 850° C. after stirring.

An exploratory filtration test was run to determine the feasibility of separately recovering from the molten dross a significant portion of the molten salt and molten metal substantially free of solid ash constituents. The 815-gram sample of the molten dross was filtered through a sintered filter to produce a filtrate consisting of 190 grams of molten salt, 27 grams of molten aluminum, and 12 grams of ash. The recovered filter cake contained 388 grams of ash with 198 grams of molten salt occluded in its interstices. No aluminum was detected in the filter cake. The ash content of the filtrate and filter cake was 0.5 and 66.2% by weight, respectively. It is thus noted that about 50% of the molten salt and all of the molten aluminum were recovered in the filtrate in an essentially pure state.

The remaining salt and insolubles in the filter cake are readily separable by aqueous processing as heretofore described. Thus, this example demonstrates that the process of the present invention can substantially reduce the amount of salt which must be subjected to aqueous processing for complete separation of the salt and insoluble impurities. Further, it demonstrates that a molten filtrate consisting of substantially pure salt and metal is recoverable for return to the aluminum metal recovery process without the substantial thermal losses which are ordinarily associated with aqueous processing. In conventional aqueous processing of a metal recovery byproduct, all of the dross is first cooled, and then the recovered salts must be dried and remelted.

In the foregoing run, no attempt was made to optimize salt and aluminum recovery from the filter cake or to optimize the filter pore size for separation of solid ash impurities from the salt and aluminum.

While the invention has been described with respect to specific process parameters and metal recovery byproducts, and what is now considered to represent its best embodiment has been illustrated and described, the invention may be otherwise practiced than as described herein as will be readily apparent to those skilled in the art. Accordingly, this invention is not to be limited by the illustrative embodiments thereof, but rather its scope should be determined in accordance with the following claims.

What is claimed is:

1. In a metal recovery process wherein there is produced a byproduct having solid ash constituents entrained in a melt comprising a major amount of molten salt, the improvement comprising;
    introducing said byproduct into a high-temperature filter apparatus containing a substantially cylindrical rotating filter element having inner and outer walls;
    maintaining said byproduct at a temperature above the melting points of said salt;
    providing a pressure differential across a portion of said filter element walls to cause a substantial amount of said molten salt to pass through said outer wall of said filter element and form a filter cake comprising solid ash constituents on said outer wall;
    continuously removing said filter cake from said outer wall by disposing a blade adjacent to the surface of said outer wall; and
    separately recovering from said filter apparatus a molten filtrate passing through said filter element walls for recycle to said metal recovery process, said filtrate comprising the molten salt and having a substantially reduced ash content.

2. The process of claim 1 wherein said melt further includes molten metal and said molten metal is recovered in said molten filtrate.

3. The process of claim 1 wherein the removal of said filter cake is facilitated by providing a positive pressure differential across said filter element walls immediately adjacent said blade to lift the filter cake toward the blade.

4. The process of claim 2 wherein said melt contains a minor amount of molten aluminum and a major amount of the molten salts of the chlorides of sodium and potassium in admixture.

5. The process of claim 4 wherein said melt further includes, based on the weight of the molten sodium-potassium chloride salts, up to about 20 wt % of at least one additive selected from the group consisting essentially of calcium chloride, sodium fluoride, potassium fluoride, and calcium fluoride.

6. The process of claim 2 wherein said filter cake upon removal from said outer wall is cooled in an inert atmosphere to a temperature below about 300° C. to prevent oxidation of any metal contained therein.

7. The process of claim 6 further including the steps of digesting the cooled filter cake with an aqueous solution to form a slurry in which said solid ash constituents are suspended, and filtering said slurry to separate the insoluble ash constituents from the concentrated salt solution filtrate.

8. The process of claim 7 further including partially evaporating said filtrate to form a slurry of dispersed salt in said partially evaporated filtrate, and then filtering said slurry to recover the dispersed salt therefrom and provide a resultant filtrate consisting of a saturated aqueous salt solution for return to the digestion step.

9. The process of claim 8 wherein the recovered salt is dried, melted, and recycled to the metal recovery process.

* * * * *